US012554512B2

(12) United States Patent
Mars et al.

(10) Patent No.: US 12,554,512 B2
(45) Date of Patent: Feb. 17, 2026

(54) METHODS AND APPARATUS FOR CONFIGURING WEARABLE DEVICES IN ACCORDANCE WITH CONFIGURATION DATA

(71) Applicant: Ouraring Inc., San Francisco, CA (US)

(72) Inventors: Denis Mars, San Francisco, CA (US); Simon Ratner, San Francisco, CA (US)

(73) Assignee: Ouraring Inc., San Francisco, CA (US)

( * ) Notice: Subject to any disclaimer, the term of this patent is extended or adjusted under 35 U.S.C. 154(b) by 0 days.

(21) Appl. No.: 18/748,964

(22) Filed: Jun. 20, 2024

(65) Prior Publication Data

US 2024/0385854 A1  Nov. 21, 2024

Related U.S. Application Data

(63) Continuation of application No. 17/547,174, filed on Dec. 9, 2021, now Pat. No. 12,032,973.

(60) Provisional application No. 63/123,252, filed on Dec. 9, 2020.

(51) Int. Cl.
*G06F 9/445* (2018.01)
*H04L 9/40* (2022.01)

(52) U.S. Cl.
CPC ........ *G06F 9/4451* (2013.01); *H04L 63/0884* (2013.01)

(58) Field of Classification Search
CPC .............. G06F 9/44505; G06F 9/4451; G06F 9/44526; G06F 9/44563; G06F 5/44584
See application file for complete search history.

(56) References Cited

U.S. PATENT DOCUMENTS

| | | | |
|---|---|---|---|
| 9,858,799 B1 | 1/2018 | Deluca et al. | |
| 12,032,973 B1 * | 7/2024 | Mars | G06F 9/4451 |
| 2016/0249174 A1 | 8/2016 | Patel et al. | |
| 2016/0287165 A1 | 10/2016 | Abreu | |
| 2017/0206559 A1 | 7/2017 | Bakshi et al. | |
| 2021/0045169 A1 | 2/2021 | Pupakdee et al. | |
| 2023/0062700 A1 | 3/2023 | Decrop et al. | |

* cited by examiner

*Primary Examiner* — Raymond N Phan
(74) *Attorney, Agent, or Firm* — Holland & Hart LLP

(57) ABSTRACT

A method includes providing with a first wearable smart device, a plurality of identification signals associated with a first user, receiving with a second wearable smart device, the plurality of identification signals, determining with a processor of the second wearable smart device, configuration data for the second wearable smart device in response to the plurality of identification signals, configuring with the processor, the second wearable smart device in response to the configuration data, receiving with an input portion of the second wearable smart device a user input, and directing with the processor, performance of a tangible action in response to the configuration data and to the user input.

20 Claims, 8 Drawing Sheets

METHODS AND APPARATUS FOR CONFIGURING WEARABLE DEVICES IN ACCORDANCE WITH CONFIGURATION DATA

CROSS REFERENCE

The present application for patent is a Continuation of U.S. application Ser. No. 17/547,174 by Mars et al., entitled "METHODS AND APPARATUS FOR CONFIGURING WEARABLE DEVICES," filed Dec. 9, 2021, which claims priority to U.S. Application No. 63/123,252 by Mars et al., entitled "METHODS AND APPARATUS FOR CONFIGURING WEARABLE DEVICES," filed Dec. 9, 2020, each of which is incorporated by reference herein.

BACKGROUND

The present invention relates to augmented or mixed reality systems. More specifically, the present invention relates to methods and apparatus for facilitating configuration of augmented or mixed reality systems, such as smart glasses, smart earbuds, or other devices.

Currently, augmented reality devices and systems are considered novelty devices to the general public. Although some systems are being used for manufacturing, medical and military applications, the high costs of such systems has contributed to the relative low adoption rate by the general public. Even with the lower costs of consumer-grade augmented reality devices, often one device may be shared among a family, a work group, or the like.

A challenge with sharing augmented reality devices is that they often need to be manually adjusted for each user to account for differences in facial geometry, hearing capability, visual preferences, and the like. Some differences between users may be easily adjusted via a physical dial (e.g. adjusting for head circumference, wheel for volume, etc.). However a problem is that many of these differences require electronic adjustment or recalibration between users, that are often tiresome for the user to perform each and every time they use the devices. Because of these difficulties, it makes it less likely that users will actually use such devices.

Additionally, another challenge is that separate users of an augmented reality devices typically have separate user accounts associated therewith. As an example, a first user may have a Steam account with three programs, whereas a second user may have a Steam account with ten programs, and the like. When the different users attempt to use the augmented reality device, they will often have to logout of a previous user's account and to log into their user account, before they put on the device. The inventors of the present invention also consider these pairing functions cumbersome and also make it less likely that users will actually use such augmented reality devices.

In light of the above, what is desired are improved methods for facilitating configuration of smart devices such as augmented reality devices without the drawbacks discussed above.

SUMMARY

The present invention relates to augmented or mixed reality systems. More specifically, the present invention relates to methods and apparatus for facilitating configuration of augmented or mixed reality systems, such as smart glasses, smart earbuds, or other devices.

Some embodiments disclose methods and systems for facilitating configuration of augmented reality (AR) devices via the use of an additional user smart device (e.g. a smart ring, a smart watch, a smart fitness band, a smart phone, or the like) and a storage account or data associated with the user. In some operations, as a user specifies configuration data for the AR device, the user configuration data may be stored in a user account, typically associated with the AR device. A token associated with the user account is then generated and provided for storage in the additional user smart device. At a later time, typically when the user authenticates themselves to the additional user smart device, that additional user smart device may output the token to the AR device. The AR device then uses the token to access the user account and to provision the AR device to the user's preferences. The user may then use the AR device without having to perform significant manual configuration.

Additional embodiments disclose the methods and systems for facilitating configuration of augmented reality (AR) devices via the use of an additional user smart device (e.g. a smart ring, a smart watch, a smart fitness band, a smart phone, or the like) and an authentication provider service. In operation, as a user specifies configuration data for the AR device, the user configuration data may be transmitted to the authentication provider service and associated with a user account. At a later time, typically when the user authenticates themselves to the additional user smart device, that device may enter an advertisement mode. When the AR device receives the advertisement, it sends AR identifying information to the additional smart device. In response, the additional smart device sends user-identifying information and the AR identifying information to the authentication provider service. The services determines the user account from the user-identifying information and determines user configuration data for the AR device. The authentication service provider creates a token including the user configuration data in a token payload, and provides the token to the AR system. If the AR system authenticates the token, the AR system uses the token payload to configure the AR system for the user.

Some benefits to the herein disclosed embodiments are that AR systems will be easier for users to configure and use. Accordingly, it is expected that the use and adoption of AR systems will increase leading to more development and sales of more advanced AR systems in the future. Additional benefits are believed to include a more secure and authorized access to user configuration data for AR and other smart devices.

According to an aspect, a method is disclosed. A technique may include providing with a first wearable smart device, a plurality of identification signals associated with a first user, receiving with a second wearable smart device, the plurality of identification signals, and determining with a processor of the second wearable smart device, configuration data for the second wearable smart device in response to the plurality of dentification signals. A process may include configuring with the processor, the second wearable smart device in response to the configuration data, receiving with an input portion of the second wearable smart device a user input, and performing with the processor, a tangible action response to the configuration data and to the user input.

According to another aspect, a system is disclosed. A device may include a first wearable smart device comprising a first device configured to provide a plurality of identification signals associated with a first user. An apparatus may include a second wearable smart device including a receiver configured to receive the plurality of identification signals from the first wearable smart device, a processor configured to determine configuration data for the second wearable smart device in response to the plurality of identification signals, and wherein the processor is configured to configure the second wearable smart device in response to the configuration data, and a user input portion configured to receive a user input, wherein the processor is configured to perform a tangible action for the user in response to the configuration data and to the user input.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

Figure 1:
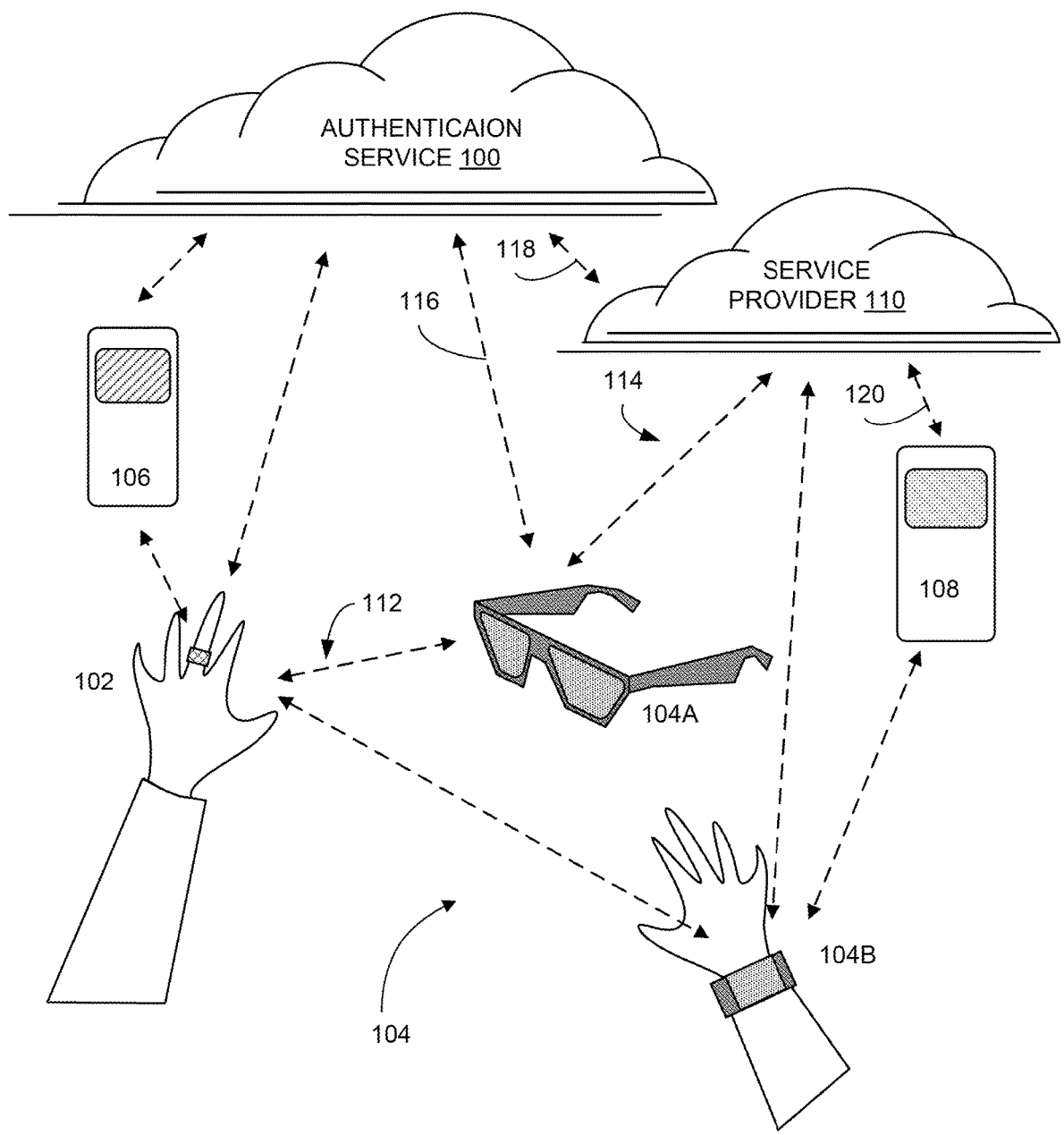
FIG. 1 illustrates a system diagram according to various embodiments.

FIG. 1 illustrates a block diagram according to some embodiments of the present invention. More specifically, FIG. 1 illustrates an authentication provider service 100, e.g. cloud-based authentication provider service; a wearable first smart device 102, e.g. a smart ring, a smart headphone, smart glasses, a smart watch, a smart tracker, an implanted smart device, and the like; and a second smart device 104, e.g. a smart phone, a virtual reality system, an augmented or mixed reality system 104A, a PC, a smart watch 104B, and the like. Also illustrated in FIG. 1 are some embodiments that may include a third smart device 106 (e.g. a smart phone, PC, or the like).

In various embodiments, wearable smart device 102 may directly interact with authentication provider service 100 or indirectly, were third smart device 106 facilitates the interaction, or the like. In some embodiments, first smart device 102 may interact with authentication provider service 100 via a combination of Bluetooth, Wi-Fi, Cellular data, and the like. In various embodiments, second smart device 104 may interact directly with a smart device provider service 110 and authentication provider service 100. For example, second smart device 104 may use a wide area network, e.g. Wi-Fi, cellular data (e/g/$g, 5G), mesh network, wired network or the like to communicate with services 100 and 110. In some embodiments, fourth smart device 108 may facilitate such interactions. For example, second smart device 104 may use Bluetooth, ZigBee, UWB, or the like to communicate with fourth smart device 108. In turn, fourth smart device 108 communicates with services 100 and 110 via a wide area network, as discussed above.

In various embodiments, wearable first smart device 102 may interact with second smart device 104 in a number of wired (e.g. USB) or wireless ways, such as via optical barcode, light pattern, NFC, Bluetooth, ZigBee, Wi-Fi, UWB or the like.

Figure 2:
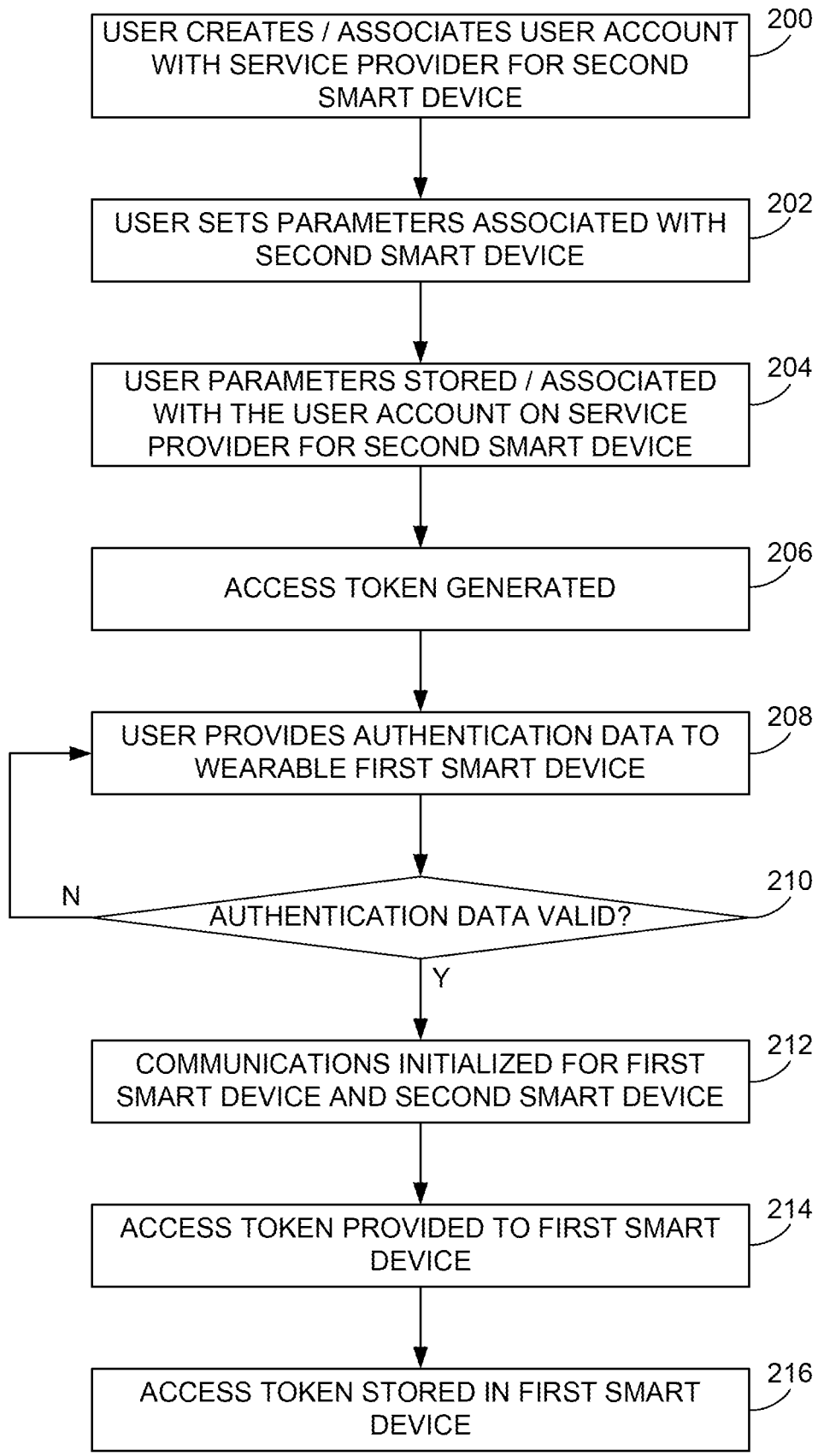
FIG. 2 illustrates a flow diagram according to various embodiments of the present invention.

FIG. 2 illustrates a flow diagram of processes according to various embodiments of the present invention. Referring to the elements in FIG. 1, in FIG. 2, a user initially registers themselves using a second smart device 104 or other hardware device similar to second smart device 104, step 200. Such embodiments may include the user creating an account with service provider 110 (e.g. Viveport, Quest Store, Steam) with second smart device 104 or linking 118 to an account with an authentication provider service 100 such as an existing account (e.g. operating system account, Windows, MacOS, etc.), an email account (Gmail, Yahoo! mail, etc.), a social media account (e.g. Facebook, Meta, Twitter, Instagram, etc.), a cloud storage account (e.g. Dropbox, Box, etc.), a device account (e.g. iTunes, Google, etc.) or the like.

Next, after the user creates an account, the user may define one or more configurations or parameters for second smart device 104, and the like, step 202. Examples of configurations may include, for smart listening devices (e.g. earbuds): an equalization profile, hearing parameters, volume, audio guidance parameters (e.g. specified sounds associated with specified directions, language), left/right balance, downloaded audio, and the like; for augmented/mixed reality/smart glasses: brightness and display parameters, color space and gamut, display icons, refresh rate, resolution, maps, documents, interpupillary distance (IPD), and the like; for a smart watch/fitness tracker: display parameters, device display images or wallpapers, haptic feedback, applications available, email accounts, text messages, contact lists, audio playlists, documents and other user-specified data; and the like. Generally for typical devices additional data may also include data such as: manufacturer names or identifiers, model names or identifiers, serial numbers, software version numbers, and the like. It should be understood that the types of data described above are not limited to the devices listed, for example, sounds may also be specified for smart watches, volume parameters may be specified for smart glasses, playlists may be specified for smart listening devices, and the like. The user data associated with second smart device 104 need to be static, and it is contemplated that as the user uses second smart device 104, additional data will be included as user data for second smart device 104.

In various embodiments, the user parameters are associated with the user account and are stored, sometimes in service provider 102, step 204. In one example, the user parameters may be stored in one or more data files, and the one or more data files are associated with the user account, the user parameters may be stored in a database, or the like.

In some embodiments, an access token associated with second smart device 104 may be generated, step 206. In various examples, the authorization token may be provided directly by a service provider associated with second smart device 104 (e.g. Vive, Bose, Apple, etc.) may be an OAuth, OAuth 2 token or the like, may be provided by a third-party provider (e.g. Google, Facebook, Twitter, or the like as discussed above). In some embodiments, the token may be non-expiring, and in other embodiments, the access tokens may be short-lived and have an expiration time.

In some embodiments, security of the user parameters may not be as important, so a token may be non-expiring. In such embodiments, the user parameters may include, brightness levels, IPD, volume levels, interface language, keyboard layout, localization data, and the like. In these examples, it is not typically critical if the access token is stolen or transmission of the access token may be intercepted, because important user data (e.g. email address, user names, etc.) are not associated with the access token. In some other embodiments, the access token may include a uniform resource locator (URL), a network address, or the like which may be accessed by second smart device 104 to retrieve the user preference data stored therein, a cloud storage location which may be accessed by second smart device 104 to retrieve the user configuration data stored therein, and the like. In some embodiments, these tokens may be encrypted using a private key associated with service provider 102 and encrypted using a public key associated with a user of second smart device 104.

Subsequently, in various embodiments, the user may initialize wearable first smart device 102 or reauthorize their access to wearable first smart device 102. This process may include a user providing biometric data to first smart device 102 and having first smart device 102 record the user biometric data as authorized biometric data in first smart device 102. In some cases, this process may include a user providing user biometric data to first smart device 102, step 208 and having first mart device 102 compare the user biometric data to authorized biometric data already stored in first smart device 102, step 210 In various examples, the biometric data may include fingerprint data, capillary image data, voice data, movement data (e.g. gesture or behavioral data), iris image data, and the like. Other types of data may include movement of first smart device 102, e.g. two turns of a ring clockwise, three turns counter-clockwise, and one turn clockwise; pointing to the north, then south, then north, then east, then north, tapping a rhythm pattern or other pattern, e.g. "SOS" or other password in Morse code; and the like. Other types of physical manipulation are contemplated in additional embodiments.

In some embodiments, after user access to first smart device 102 is authorized, first mart device 102 and second smart device 104 may initiate communication with each other, step 212. In some cases, the communication may be made via a wired connection, e.g. USB, Thunderbolt, or the like. In still other cases, the communication may be facilitated by a cloud-service, e.g. authentication provider service 100, service provider 110, or the like. In various embodiments, after communication is established, second smart device 104 may provide the access token to first smart device 102, step 214, which then stores the access token, step 216. It is contemplated that the access token is stored in a secure location within first smart device 102, such that the authentication token cannot be retrieved, unless the user is authenticated by first smart device 102.

In some embodiments, as discussed above the user preference data may include non-important user data (e.g. non user-identifiable data) such as general configuration data, (e.g. inter pupillary distance (IPD), brightness preferences, etc. In such cases, the access token may directly encode or represent such user preference data. Further, this access token may directly encode or represent such user preference data. Further, this access token may be reduced to a tangible form, such as optical barcode, QR code, or the like that can be easily output or displayed by first smart device 102. In some examples, the optical barcode may be displayed on a display of wearable first smart device 102, the optical barcode may be printed on to a sticker, or the like and affixed to first smart device 102, or the like. Additionally, in some embodiments described below, the token may be reduced to a pattern of light signals output by wearable first smart device 102 and observable to other smart devices (e.g. 104A). Alternatively, the token data may be stored in first smart device 102 and can be output via NFC communication signals in response to NFC query signals from second smart device 104.

Figure 3:
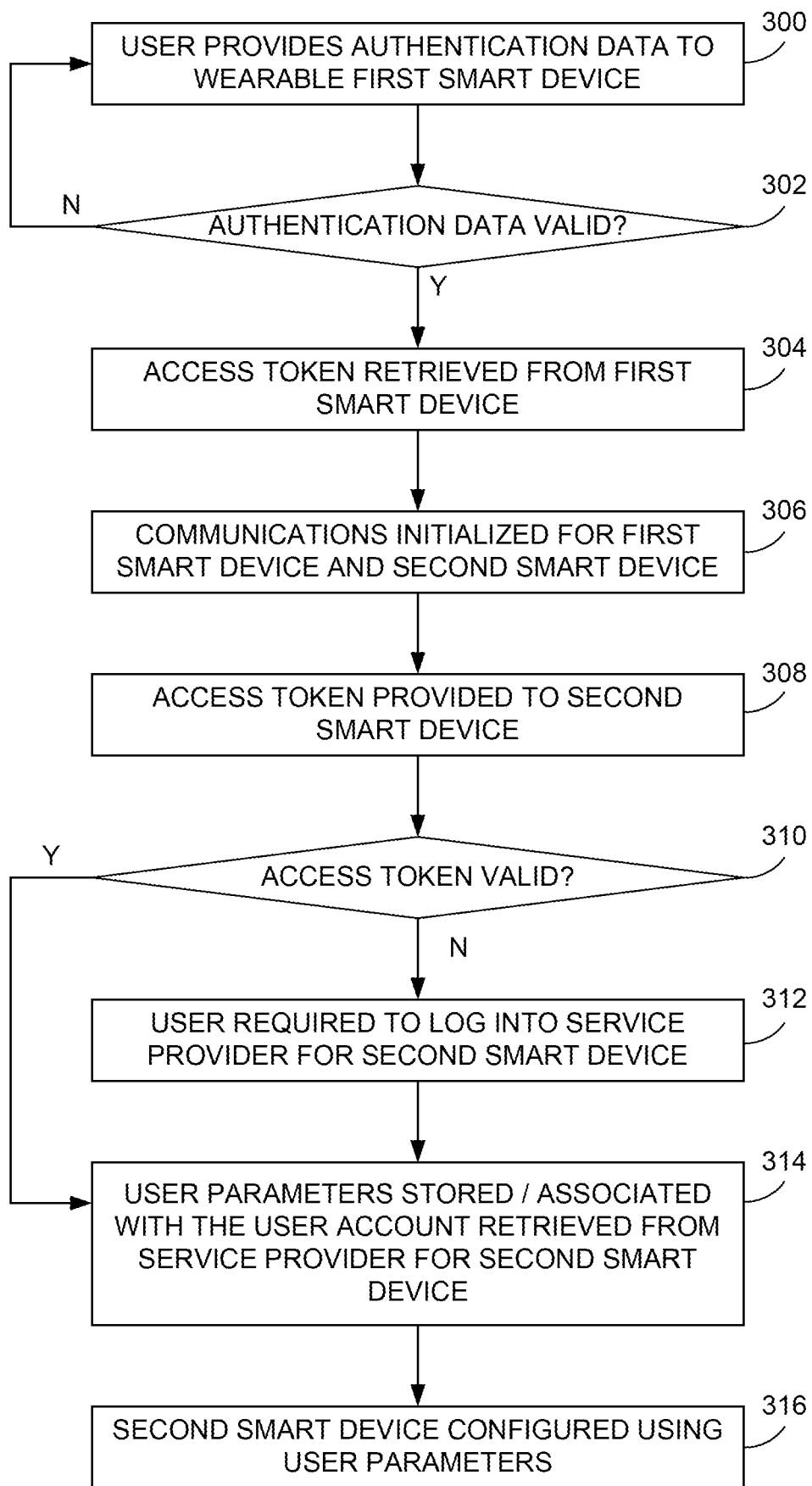
FIG. 3 illustrates a flow diagram according to various embodiments of the present invention.

FIG. 3 illustrates a flow diagram according to various embodiments of the present invention. The steps described below may occur after the process illustrated in FIG. 2, for example, one hour later, one day later, or the like. As discussed above, an access token associated with the user and second smart device 104 is stored in first smart device 102 in step 214, and may be valid for a limited period of time.

In various embodiments, the user enters authorization data/biometric data to first smart device 102, step 300. As discussed above, this data may include a combination of one or more of: fingerprints, gesture data, motion data, tapping patterns, or the like. In some cases, the process in FIG. 3 continues if first smart device 102 determines that the authorization data is valid, step 302.

In various embodiments, the access token previously provided by second smart device may be retrieved form a secure memory portion of first smart device 102, step 304. As discussed above, in some embodiments, the access token provides access to user-identifiable data, in some embodiments, the access token provides access to user-identifiable data, in some embodiments, the access token may store user preference data that does not contain user-identifiable data (e.g. user names, email address, etc.), in some embodiments, combinations of the above embodiments may be used, and the like.

Next, in various embodiments, first smart device 102 and second smart device 104 (e.g. 104A, 104B, etc.) may initiate communication 112 with each other, step 306. As disclosed above, in some cases, the communication may be made wirelessly, e.g. Bluetooth, ZigBee, Wi-Fi, NFC or the like; in other cases, the communication may be made via a wired connection, e.g. USB, Thunderbolt, or the like; and in still other cases, the communication may be facilitated by a cloud-service, e.g. authentication provider service 100, service provider 110, or the like. In various embodiments, after communication is established, first smart device 102 provides the access token to second smart device 102, step 308.

As examples of the transfer process, first smart device 102 may initiate contact with second smart device 102 via BLE and after appropriate handshaking, first smart device 102 may transfer the access token data to second smart device 104. In another example, second smart device 104 may output NFC signals (e.g. electromagnetic signals) to first smart device 102, and in response (after any appropriate security handshaking) first smart device 102 may output the access token via NFC signal to second smart device 104. In another example, the token data may be visible on the surface of first smart device 102 in the form of an optical barcode (via a sticker, a display, or the like), and second smart device 104 may capture the optical barcode via a camera, or the like. In yet another example, first smart device 102 may have one or more LED lights that output visible (or IR) light signals, and second smart device 104 may use a camera to capture the light signals. As an example, the LED lights may be used to output a string of light pulses (formatted in an agreed format) that are captured by a camera or optical sensor of second smart device 104. In some embodiments, these string of light pulses may encode the access token data discussed herein.

In some embodiments, the token may be decrypted to recover a payload. As examples, the token may be decrypted using a public key of service provider, a public key associated with a user of first smart device 102, a private key associated with second smart device 104, a combination of the above, and the like.

In some embodiments, second smart device 104 also determines whether the access token is valid, step 310. In some cases the access token may have been valid, but now has expired; in some cases the access token is not recognized (i.e. the user of first smart device 102 has not registered an account with second smart device 104); and the like. In some cases where the access token is invalid, the user may be asked to manually log into second smart device 104, to create an account, or the like, step 312. In cases where the access token is considered valid, the access token may be used to authorize second smart device 104 to retrieve user preference data, and the like, 114, step 314. As mentioned above, in some cases the token may, in part or in whole, directly represent the user preference data (i.e. parameters associated with the user), or the like.

In some embodiments, the token may include a location or a pointer to where the user preference data may be retrieved, or the like. As an example of this embodiment, second smart device 104 may request and receive the encrypted data 116, associated with the user from service provider 100. That encrypted data may then be decrypted within second smart device 104 using a public key of service provider 100, a private key of smart device 104, and the like. In one embodiment, encrypted data that is provided, 112, by device 102 to 112 may include a key associated with the user, a user account identifier (associated with service 100 or 110), and the like. In some embodiments, the encrypted data may also include a file location, the service provider, or the like within service provider 100 or 110. IN some embodiments, using the user account identifier, the specified file location, or the like, service provider 100 or 110 may provide one or more additional encrypted data files associated with the user. Next, using one or more keys discussed above (e.g. key associated with the user, etc.) the additional encrypted data files may be decrypted and the user preferences, accounts, etc. associated with second smart device 104 may be recovered.

In various embodiments, the user preference data may be used to configure or provision second smart device 104, step 316. For example, the user preference data may include logging into a user account to determine which software is licensed for the user to use; to setup physical parameters of second smart device 104 (e.g. volume, images, etc.); to log into email, messaging, social media accounts, or the like. In some embodiments, the user may have to enter/reenter a password, passcode, PIN, or the like in second smart device 104 before the user may use second smart device 104. In various embodiments, second smart device 104 is then configured appropriately for use by the user. The user may then use the second smart device 104, For example, the user may request video or audio data to be played, the user may run one or more programs, and the like.

Figure 4A:
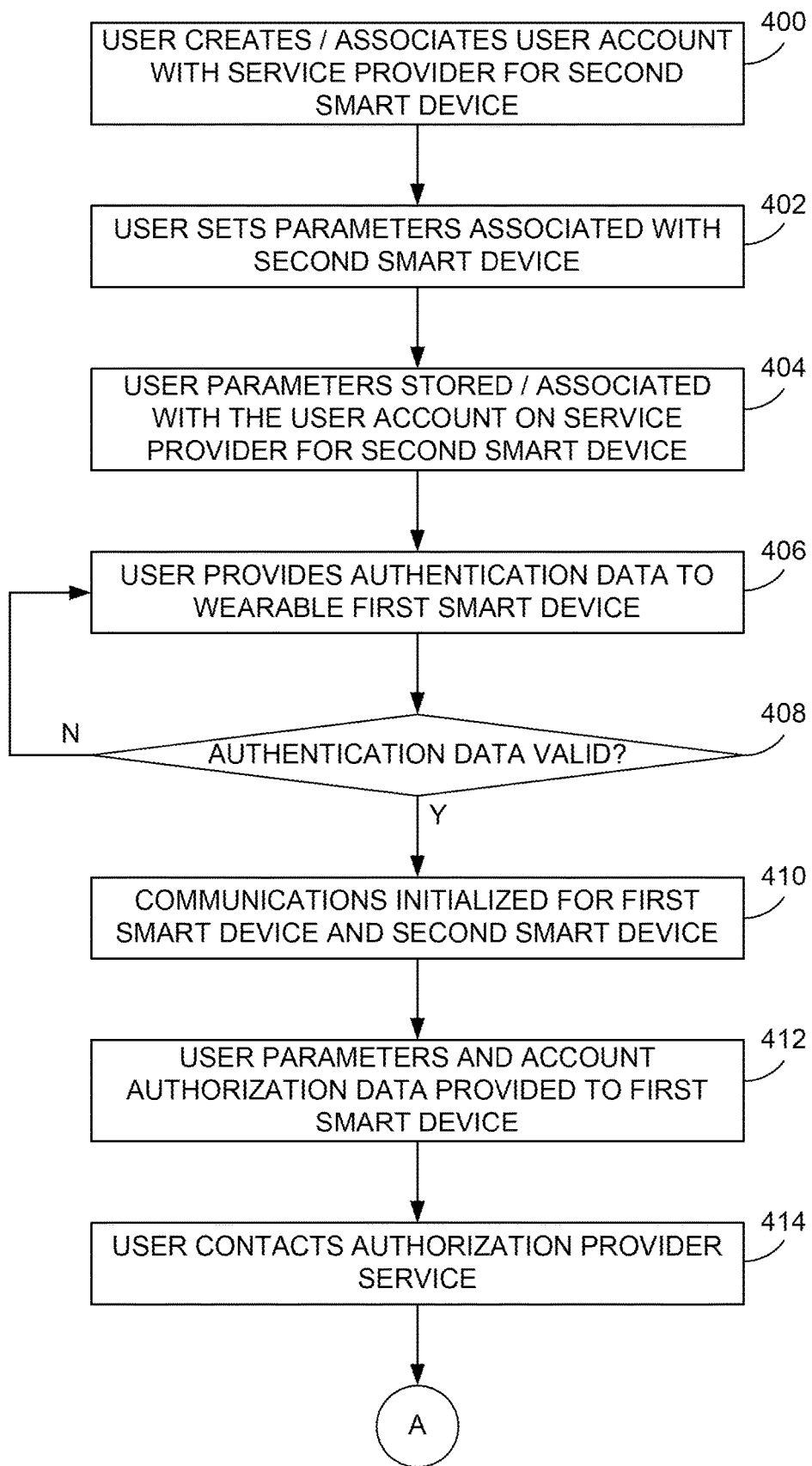
FIGS. 4A-B illustrate a flow diagram according to various embodiments of the present invention.
Figure 4B:
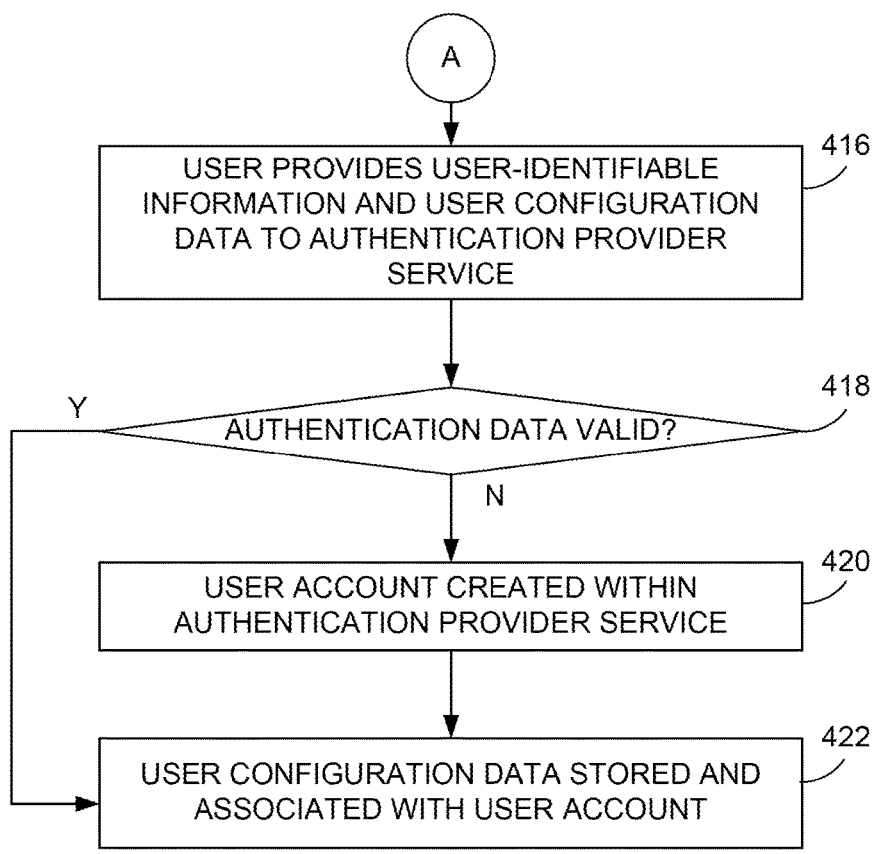

FIGS. 4A-B illustrate another flow diagram according to some embodiments of the present invention. Referring to the elements in FIG. 1, in FIGS. 4A-B, a user initially registers with second smart device 104 or other hardware device similar to second smart device 104 (e.g. 108), step 400. Such embodiments may include the user creating an account with service provider 110 for second smart device 104, or linking 118 to an account with an authentication provider service 100 such a described above, or an authentication provider service provided by the assignee of the present patent application.

Next, after the user creates an account, the user may define one or more configurations or parameters for second smart device 104, and the like, step 402 As discussed above, the user configuration data may include: an equalization profile, hearing parameters, volume, audio guidance parameters, left/right balance, downloaded audio, brightness and display parameters, display icons, specified visual guidance directions, maps, documents, interpupillary distance (IPD), display parameters, device display images or wallpapers, applications available, email accounts, text messages, contact lists, audio playlists, documents and other user-specified data, device hardware and software identifiers, and the like. In some examples, the configuration data may also include: manufacturer names or identifiers, model names or identifiers, serial numbers, software version numbers, and the like.

These user parameters may be uploaded (e.g. 120) and associated with the user account and may be stored in service provider 110, step 04. In one example, the user parameters may be stored in one or more data files associated with the user account.

Next, in various embodiments, the user may initialize wearable first smart device 102 or reauthorize their access to wearable first smart device 102. This process ay include a user providing biometric data to first smart device 102 and having first smart device 102 record the user biometric data as authorized biometric data in first smart device 102. In some cases, this process may include a user providing user biometric data to first smart device 102, step 406 and having first smart device 102 compare the user biometric data to authorized biometric data already stored in first smart device 102, step 408. As mentioned above, the biometric data may include fingerprint data, capillary image data, voice data, movement data (e.g. gesture or behavioral data), iris image data, and the like. Other types of data may include movement of first smart device 102, e.g. two turns of a ring clockwise, three turns counter-clockwise, and one turn clockwise; pointing to the north, then south, then north, then cast, then north; tapping a rhythm or the like.

In some embodiments, after user access to first smart device 102 is authorized, first smart device 102 and second smart device 104 may initiate communication with each other, 112, step 410. In some cases, the communication may be made wirelessly, e.g. Bluetooth, ZigBee, Wi-Fi, or the like. In other cases, the communication may be made via a wired connection, e.g. USB, Thunderbolt, or the like In some embodiments, after communication is established, second smart device 104 may provide the captured user configuration or preference data, which may also include an access token or authorization data associated with service provider 110, to first smart device 102, step 412.

In various embodiments, first smart device 102 then contacts authentication provider service 100, step 414, and provides user-identifiable data, step 416. In some cases, first smart device 102 may communicate directly with authentication provider service 100, via wide area network (e.g. Wi-Fi, Ethernet, etc.). In other cases, first smart device 102 communicates the user configuration data (possibly including user account login token), and the like to third smart device 106 via short-range communications (e.g. Bluetooth, UWB, NFC, wired interface), or the like, and third smart device 106 communicates with authentication provider service 100 via wide area network. In some embodiments where third smart device 106 facilitates the communication, an executable application under development by the current assignee of the present application may run upon third smart device 106. The application directs the processor of the third smart device to provide user data including user-identifiable information, e.g. the user's email address, telephone number, a user name, or the like, and the user configuration data that was received in step 412, above. In other examples, the authentication provider service first authenticates the user, via user-identifiable information, before the user configuration data is provided.

In some embodiments, the user-identifiable information is compared to accounts stored within authentication provider service 100, step 418. If no associated user account is found, an account within authentication provider service 100 may be created, step 420. If a user account is found, the user configuration data provided in step 416 is stored in an account associated with the user-identifiable information, step 422.

Figure 5A:
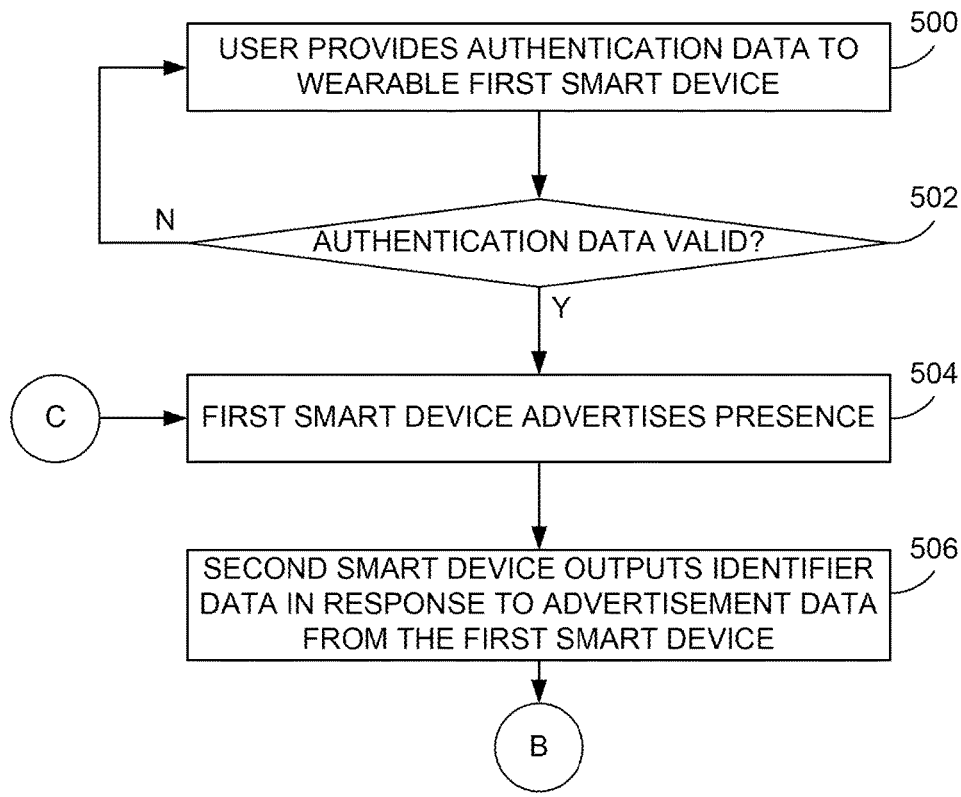
FIGS. 5A-B illustrate a flow diagram according to various embodiments of the present invention.
Figure 5B:
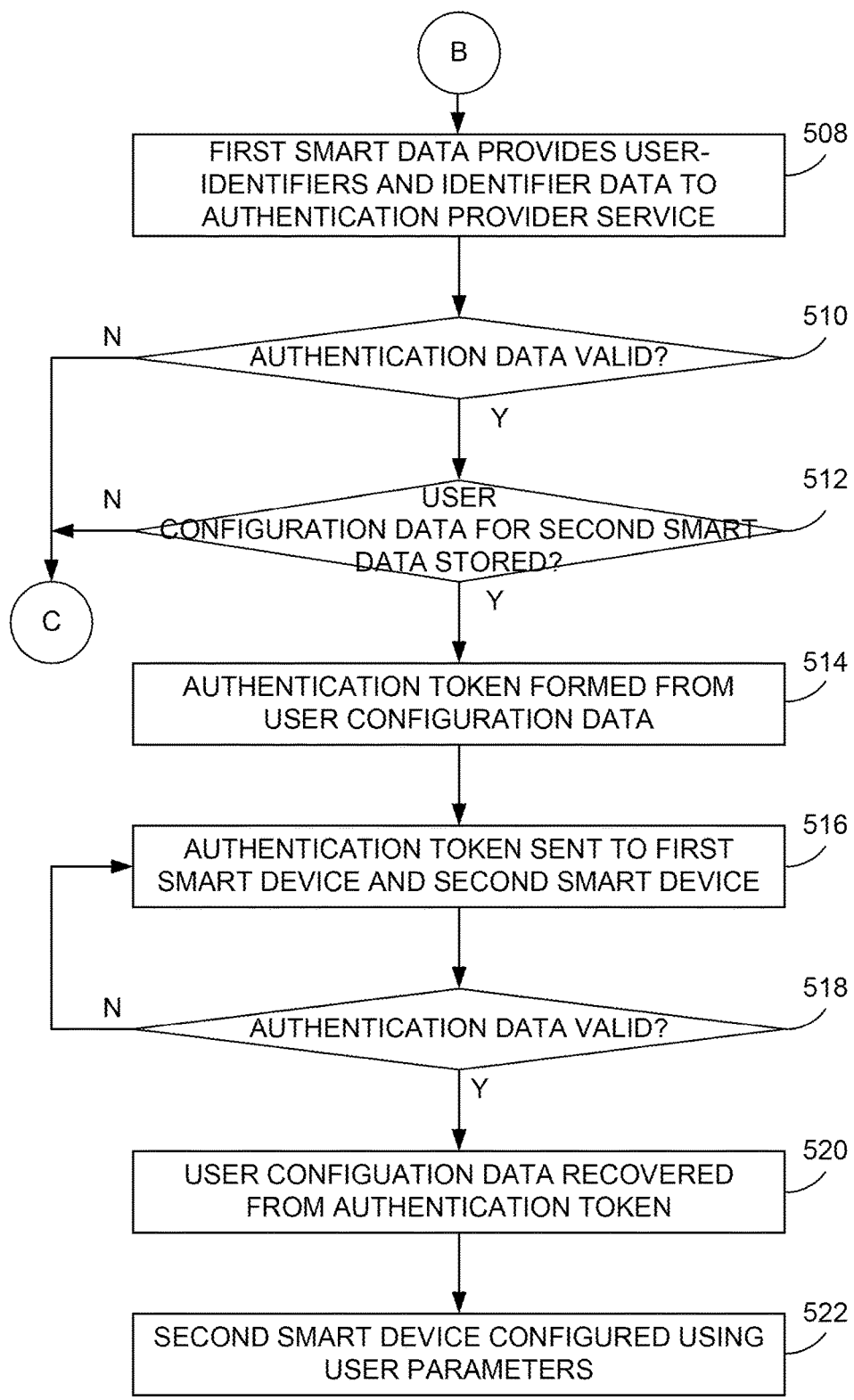

FIGS. 5A-B illustrates a flow diagram according to various embodiments of the present invention. The steps describe below may happen after the process illustrated in FIGS. 4A-B, for example, one hour later, one day later, or the like.

In various embodiments, the user enters authorization data/biometric data to first smart device 102, step 500. As discussed above, this data may include a combination of one or more of: fingerprints, gesture data, motion data, tapping patterns, or the like. In some cases, the process in FIGS. 5A-B continue if first smart device 102 determines that the authorization data is valid. step 502.

Next, first smart device 102 may then begin providing advertisement signals, step 504. In various examples, the advertisement signals may be provided on via a short-range transceiver, e.g. Bluetooth, UWB, ZigBee, NFC or the like. In some cases, the advertisement signals may not be permanently associated with first smart device. In other words, the advertisement signals are ephemeral identifiers. Next, second smart device 104 receives the advertisement signals, and outputs identifier data, step 506. In some examples, the identifier data may identify the type of device (e.g. AR goggles, smart glasses), the manufacturer of the device (e.g. Oculus, Bose, etc.), a model of the device (e.g. iPhone 12 mini), a serial number or other identifier, a time stamp, a nonce, and the like. This communication may use the same short-range communication means discussed above, or the like.

In various embodiments, first smart device 110 may provide the identifier data along with user-identifiable information (such as previously provided in step 416, for example) to authentication provider service, step 508. As discussed above, in some embodiments, first smart device 102 may communicate directly with authentication provider service 100, and in other embodiments, first smart device 102 may use the application running upon third smart device 104 to facilitate communication with authentication provider service 100. Any combination of short-range (e.g. BLE, UWB, NFC) or wide area (e.g. Wi-Fi, cellular data) communications channels may be used for these data transfers.

In some embodiments, authentication provider service 100 determines if the user-identifier is authorized to access a user account within authentication provider service 100, step 510. This process may include two determinations; if the user-identifier is associated with a user account in authentication provider service 100, and if the user is authorized to access the user account. The later determination may be used in cases where user access to authentication provider service 100 is provided by subscription service (e.g. software as a service), by corporate or individual policies, or the like.

In various embodiments, if access to the user account is provided, authentication provider service may determine whether any user configuration data associated with second smart device 104 is stored therein, step 512. In some embodiments, this determination may use some of the identifier data of second smart device 104 received by first smart device 102 in step 506, above. For example, authentication provider service 100 may use the model identifier/product identifier, e.g. Bose/Audio Sunglasses, Apple/iPhone 12 pro, Google/Glass, or the like, to determine whether the user has any associated user configuration data stored for a specific device within authentication provider service 100.

As illustrated in FIG. 5B, if the user configuration data exists, authentication provider service 100 forms an authentication token including the user configuration data within a payload section of the token, step 514. In some examples, the payload section may be encrypted with a private key of authentication provider service 100, a public or private key associated with the user, or the like. The authentication token may then be returned to first smart device 102, possibly facilitated by third smart device 108, using the same communications channels discussed above, and in turn, first smart device 102 may communicate the authentication token to second smart device 104, step 516 In various embodiments, this communication may be via methods described above, including Bluetooth, UWB, ZigBee, a wired connection, NFC, barcode, light pattern, or the like, discussed above.

In various embodiments, second smart device may determine whether the authentication token is authentic, step 518. In some examples, second smart device may use a public key associated with authentication provider service, or other key, to decrypt the authentication token to recover a time stamp, a nonce, and other payload data. The time stamp and the nonce may be used by second smart device to ensure the token has not expired, has not already been used, and the like. In various embodiments, the payload data may include the user configuration or preference data for second smart device, step 520.

In various embodiments, the user preference data may then be used to configure or provision second smart device 104, step 522. For example, the user preference data may include logging into a user account to determine which software is licensed for the user to use; to setup physical parameters of second smart device 104 (e.g. volume, images, etc.): to log into email, messaging, social media accounts, or the like. In some embodiments, the user may have to enter/reenter a password, passcode, PIN, or the like in second smart device 104 before the user may use second smart device 104. In various embodiments, the user then may use the appropriately configured second smart device 104. For example, the user may wear smart earbuds (second smart device 104) to playback text from the user's documents, e-mail, purchased audio books, and the like; the user may have augmented reality glasses (second smart device 104) run applications that the user has previously purchased, display heads-up diagrams of devices they are servicing, and the like; the user may have their smart phone provisioned with applications licensed by a company the user works for, with the user's personal audio playlists, with the user identifying information, and the like.

Figure 6:
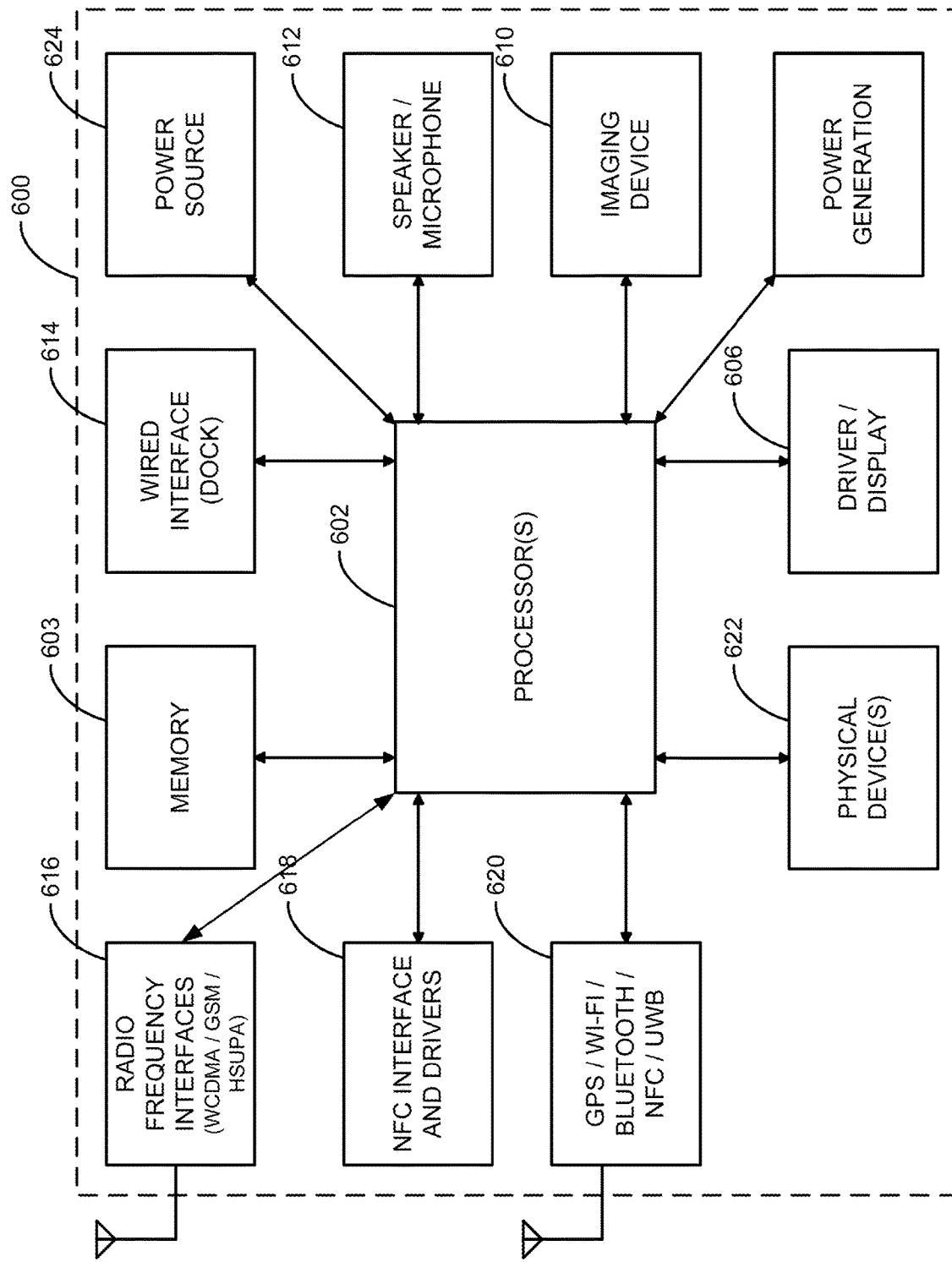
FIG. 6 is a block diagram illustrating an example of a system capable of implementing various processes in some embodiments.

FIG. 6 illustrates a functional block diagram of various embodiments of the present invention. More specifically, it is contemplated that wearable devices, smart devices, PCs and cloud-based servers may be implemented with a subset or superset of the components illustrated in FIG. 6.

In FIG. 6, a computing device 600 may include some, but not necessarily all of the following components: an applications processor 602, memory 604, a display 606, an image acquisition device 610, audio input/output devices 612, and the like. Additional communications from and to computing device 600 can be provided by via a wired interface 614 (e.g. dock. plug, controller interface to peripheral devices); a GPS/Wi-Fi/Bluetooth interface/UWB 616; an NFC interface (e.g. antenna or coil) and driver 618; RF interfaces and drivers 620, and the like. Also included in some embodiments are physical sensors 622 (e.g. (MEMS-based) accelerometers, gyros, magnetometers, pressure sensors, temperature sensors, bioimaging sensors etc.).

In various embodiments, computing device 600 may be a computing device (e.g. Apple iPad, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a smart fitness tracker (e.g. Fitbit, Apple Watch, Garmin or the like); a smart headset or AR glasses (e.g. Oculus Rift, HTC Vive, Sony PlaystationVR, Magic Leap, Microsoft HoloLens); a smart wearable device (e.g. Motiv smart ring, smart headphones); an implanted device (e.g. smart device medical), an POS device, a server or the like. Typically, computing device 600 may include one or more processors 602. Such processors 602 may also be termed application processors, and may include a processor core, a video/graphics core, and other cores. Processors 602 may include processor from Apple (A13, A14), NVIDIA (TEGRA), INTEL (Core), Qualcomm (Snapdragon), Samsung (Exynos), ARM (Cortex), MIPS technology, a microcontroller, and the like. In some embodiments, processing accelerators may also be included, e.g. an AI accelerator, Google (Tensor processing unit), a GPU, or the like. It is contemplated that other existing and/or later-developed processors/microcontrollers may be used in various embodiments of the present invention.

In various embodiments, memory 604 may include different types of memory (including memory controllers), such as flash memory (e.g. NOR, NAND), SRAM, DDR, SDRAM, or the like. Memory 604 may be fixed within computing device 600 and may include removable (e.g. SD, SDHC, MMC, MINI SD, MICRO SD, CF, SIM). The above are examples of computer readable tangible media that may be used to store embodiments of the present invention, such as computer-executable software code (e.g. firmware or application programs that are executable upon processor 602), security applications, application data, operating system data, databases or the like. Additionally, in some embodiments, a secure device including secure memory and/or a secure processor are provided to store data described above. It is contemplated that other existing and/or later-developed memory and memory technology may be used in various embodiments of the present invention.

In various embodiments, display 606 may be based upon a variety of later-developed or current display technology, including LED or OLED status lights; touch screen technology (e.g. resistive displays, capacitive displays, optical sensor displays, electromagnetic resonance, or the like); and the like. Additionally, display 606 may include single touch or multiple-touch sensing capability. Any later-developed or conventional output display technology may be used for embodiments of the output display, such as LED IPS, OLED, Plasma, electronic ink (e.g. electrophoretic, electrowetting, interferometric modulating), or the like. In various embodiments, the resolution of such displays and the resolution of such touch sensors may be set based upon engineering or non-engineering factors (e.g. sales, marketing, physical space). In some embodiments, display 606 may integrated into computing device 600 or may be separate.

In some embodiments of the present invention, acquisition device 610 may include on or more sensors, drivers, lenses and the like. The sensors may be visible light, infrared, and/or UV sensitive sensors that are based upon any later-developed or convention sensor technology, such as CMOS, CCD, or the like. In some embodiments of the present invention, image recognition algorithms, image processing algorithms or other software programs for operation upon processor 602, to process the image data. For example, such software may pair with enabled hardware to provide functionality such as: facial recognition (e.g. Face ID, head tracking, camera parameter control, or the like); fingerprint capture/analysis; blood vessel capture/analysis; iris scanning capture/analysis; otoacoustic emission (OAE) profiling and matching; and the like. In various embodiments of the present invention, imaging device 610 may provide user input data in the form of a selfie, biometric data, or the like.

In various embodiments, audio input/output 612 may include conventional microphone(s)/speakers. In various embodiments, voice processing and/or recognition software may be provided to applications processor 602 to enable the user to operate computing device 600 by stating voice commands. In various embodiments of the present invention, audio input 612 may provide user input data in the form of a spoken word or phrase, or the like, as described above. In some embodiments, audio input/output 612 may be integrated into computing device 600 or may be separate.

In various embodiments, wired interface 614 may be used to provide data or instruction transfers between computing device 600 and an external source, such as a computer, a remote server, a POS server, a local security server, a storage network, another computing device 600, a client device, a peripheral device to control, or the like. Embodiments may include any later-developed or conventional physical interface/protocol, such as: USB, micro USB, mini USB, USB-C, Firewire, Apple Lightning connector, Ethernet, POTS, custom dock, or the like. In some embodiments, wired interface 614 may also provide electrical power, or the like to power source 624, or the like. In other embodiments interface 614 may utilize close physical contact of device 600 to a dock for transfer of data, magnetic power, heat energy, light energy, laser energy or the like. Additionally, software that enables communications over such networks is typically provided.

In various embodiments, a wireless interface 616 may also be provided to provide wireless data transfers between computing device 600 and external sources, such as computers, storage networks, headphones, microphones, cameras, or the like. As illustrated in FIG. 6, wireless protocols may include Wi-Fi (e.g. IEEE 802.11 a/b/g/n, WiMAX). Bluetooth Low Energy (BLE) IR, near field communication (NFC), ZigBee, Ultra-Wide Band (UWB), Wi-Fi-6, mesh communications, NFC and the like.

GPS receiving capability may also be included in various embodiments of the present invention. As illustrated in FIG. 6, GPS functionality is included as part of wireless interface 616 merely for sake of convenience, although in implementation, such functionality may be performed by circuitry that is distinct from the Wi-Fi circuitry, the Bluetooth circuitry, and the like. In various embodiments of the present invention, GPS receiving hardware may provide user input data in the form of current CPS coordinates, or the like, as described above.

Additional wireless communications may be provided via RF interfaces in various embodiments. In various embodiments, RF interfaces 618 may support any future-developed or conventional radio frequency communications protocol, such as CDMA-based protocols (e.g. WCDMA), GSM-based protocols, HSUPA-based protocols, G4, G5, or the like. In some embodiments, various functionality is provided upon a single IC package, for example the Marvel PXA330 processor, and the like. As described above, data transmissions between a smart device and the services may occur via Wi-Fi, a mesh network, 4G, 5G, or the like.

In various embodiments, any number of future developed, current operating systems, or custom operating systems may be supported, such as iPhone OS (e.g. iOS), Google Android, Linux, Windows, MacOS, or the like. In various embodiments of the present invention, the operating system may be a multi-threaded multi-tasking operating system, e.g. RingOS, currently under development by the current assignee of the present application. Accordingly, inputs and/or outputs from and to display 606 and inputs/or outputs to physical sensors 622 may be processed in parallel processing threads. In other embodiments, such evens or outputs may be processed serially, or the like. Inputs and outputs from other functional blocks may also be processed in parallel or serially, in other embodiments of the present invention, such as acquisition device 610 and physical sensors 622.

In some embodiments of the present invention, physical sensors 622 (e.g. MEMS-based) accelerometers, gyros, magnetometers, pressure sensors, temperature sensors, imaging sensors (e.g. blood oxygen, heartbeat, blood vessel, iris data, etc.), thermometer, otoacoustic emission (OAE) testing hardware, and the like may be provided. The data from such sensors may be used to capture data associated with device 600, and a user of device 600. Such data may include physical motion data, pressure data, orientation, or the like. Data captured by sensors 622 may be processed by software running upon processor 602 to determine characteristics of the user, e.g. gait, gesture performance data, or the like and used for user authentication purposes. In some embodiments, sensors 622 may also include physical output data, e.g. vibrations pressures and the like.

In some embodiments, a power supply 624 may be implemented with a batter (e.g. LiPO), ultracapacitor, or the like, that provides operating electrical power to device 600. In various embodiments, any number of power generation techniques may be utilized to supplement or even replace power supply 624, such as solar power, liquid metal power generation, thermoelectric engines, rf harvesting (e.g. NFC) or the like.

FIG. 6 is representative of components possible for a smart reader, a smart device, an authentication server, a wearable smart device (e.g. a smart ring, an AR system) and the like for embodying the present invention. It will be readily apparent to one of ordinary skill in the art that many other hardware and software configurations are suitable for use with the present invention. Embodiments of the present invention may include at least some but need not include all of the functional blocks illustrated in FIG. 6. For example, a smart phone (e.g. access control device) configured to perform may of the functions described above includes most if not all of the illustrated functionality. As another example, a wearable device, e.g. a smart ring (electronic devices enclosed in a ring-shaped shell, enclosure, or form factor), may include some of the functional blocks in FIG. 6, but it need not include a high-resolution display 630 or a touch screen, a speaker/microphone 660, or the like. In still other examples, a cloud-based server or a virtual machine (VM) may not include image acquisition device 612, MEMs devices 622, GPS capability 616, and the like. Further components described above may be distributed among multiple computers, virtual machines, or the like.

Figure 7:
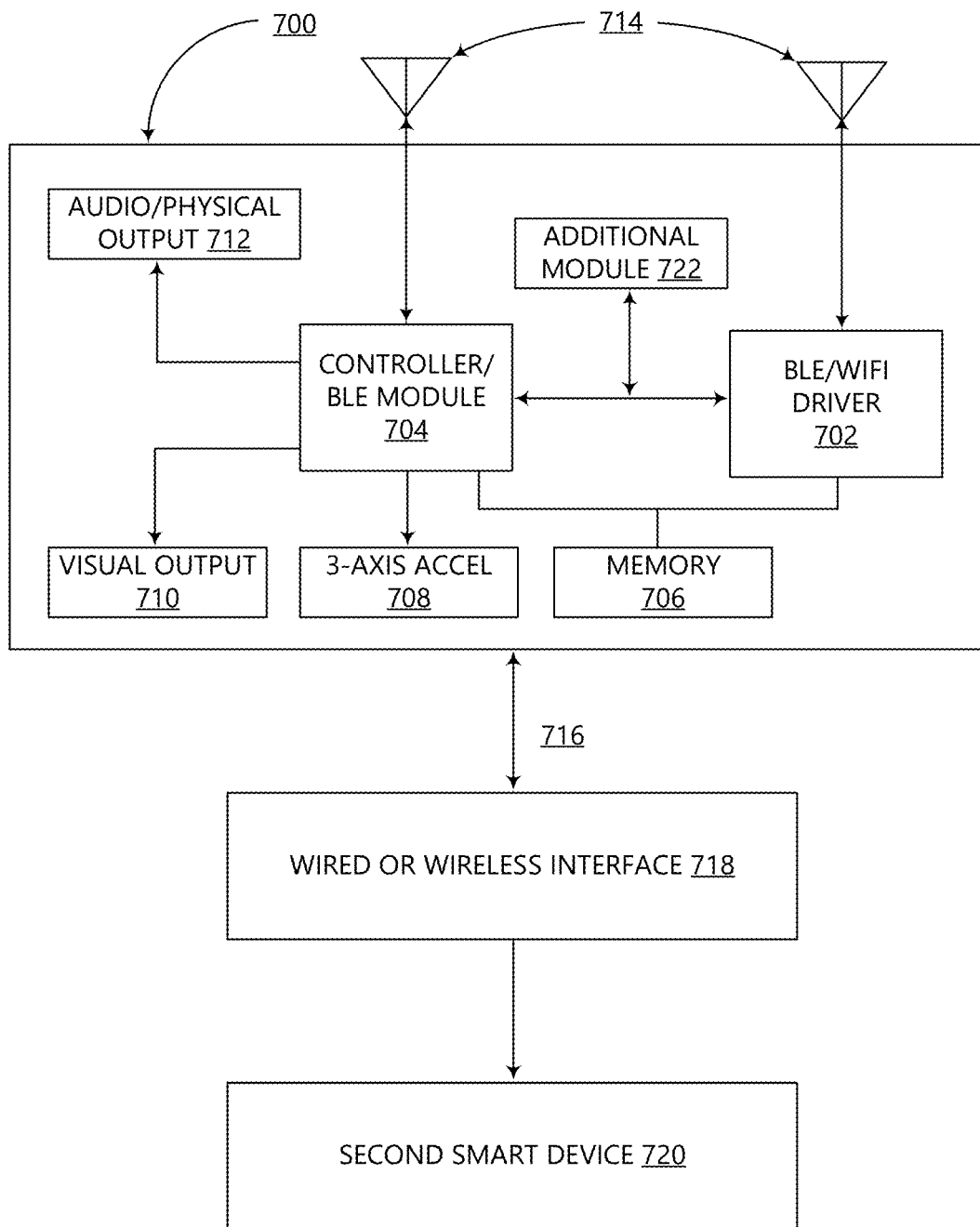
FIG. 7 is another clock diagram of a portion of a reader interface according to various embodiments of the present invention.

FIG. 7 illustrates a block diagram according to some embodiments of the present invention. More specifically, FIG. 7 illustrates a block diagram of a short-range reader device 700 that may be included within second smart device 104, describe above. Alternatively, reader device 700 may be coupled to an existing second smart device 104 to provide the short-range transmissions discussed herein and illustrated in FIG. 1A. In still other embodiments, some, but not necessarily all of the blocks illustrated in FIG. 7 may be implemented by existing hardware within second smart device 104. In operation, reader device 700 may perform the short-range communications between smart device 102 and smart device 104 as illustrated in FIG. 1. (e.g. BLE, UWB, NFC etc.).

In some embodiments, device 700 includes an rf control module 702, a controller 704, memory 706, an accelerometer 708, visual/haptic output 710, audio output 712, antennas 714, interface bus 716, and an interface module 718. In some embodiments, controller 704 may be embodied as a Nordic nRF52832 system on a chip, suitable for controlling Bluetooth low energy (BLE) communications and UWB communications, and for performing various functionalities described herein. controller 704 may include a processor, such as a 62-bit ARM® Cortex®-M4F CPU and include 712 kB to 74 KB RAM. In various embodiments, other types of SoC controllers may also be used, such as Blue Gecko from Silicon Labs, CC2508 from TI, or the like. Controller 702 may be embodied as a muRata ILD Wi-Fi/BLE module, suitable for controlling Bluetooth low energy (BLE), Wi-Fi communications. Controller 702 may include a processor, such as a 62-biy ARM®, Cortex®-M4. In various embodiments, other types of controllers may also be used, such as CYW43012 from Cypress, or the like. In some embodiments, modules 702 and 704 enable communication via short range communications protocols, such as BLE, ZigBee, UWB, NFC, Wi-Fi or the like. Modules 702 and 704 may also support mesh networking via BLE, Wi-Fi 7, or the like. In some embodiments, module 702 also supports Wi-Fi communications to communicate over a wide-area network (e.g. Internet).

In various embodiments, memory 706 may include non-volatile memory storing embodiments of the executable software code described herein. In some embodiments, the memory may be SRAM, Flash memory, the public key of authentication provider service, or the like. In FIG. 7, audio/haptic output 712 is provided to give a user with audio feedback or haptic feedback and visual output 710 is provided to give a user visual feedback in response to the user approaching reader device 700. In some embodiments, visual output 710 may be one or more LED lights having different colored outputs, may be a status display panel. The feedback may be provided to the user based upon an application running upon the smart device and interacting with reader device 700.

Accelerometer 728 is provided in some embodiments to determine whether reader device 700 is tampered with. For example, after installed and operable on a mounting location (e.g. on a wall), accelerometer 728 monitors the orientation of accelerometer 728 with respect to gravity. If a party attempts to remove reader device 700 from a mounting surface, accelerometer 708 will be able to sense the change in orientation. Based upon the change in orientation exceeding a threshold, a number of actions may be taken by reader device 700. One action may be to cease operation of reader device 700, another action may be to alert a remote server of the tampering, and the like. In other embodiments, other physical sensors, e.g. pressure sensors, light sensors, gyroscopes, and the like may be used Such embodiments may also provide tamper detection indication.

In FIG. 7, interface 716 is used to couple reader device 700 to interface module 718. In various embodiments, interface module 718 interfaces with any number of external functional modules, e.g. NFC reader device, or the like. In one configuration, an external functional module 720 may be second smart device 104, or the like. In some embodiments, interface 716 may provide power to reader module 700, interface 716 may transmit data from reader device 700 to interface module 718 (e.g. credentials), provide power or the like.

In one configuration, rf control module 702 is not used, and only one antenna 714 is provided, or vice versa; in another configuration, modules 702 and 704 are both used, and two antennas 714 are used (one specifically for scanning for ephemeral IDs within a geographic region and one specifically for handing communications with a smart device). Such embodiments are particularly useful in high volume situations wherein one antenna may receive ephemeral IDs from many different smart devices (e.g. five users walking down a hall near a security door or vending machine), whereas the other antenna will provide the credentials and receive tokens from the specific users' smart devices who want to interact with the reader (e.g. to enter the security door, to receive a good, to access a computer, receive power or the like). In other embodiments, other channels may be used to provide the above communications, such as short-range Wi-fi, Zigbee, NFC, ANT, UWB or the like.

Further embodiments can be envisioned to one of ordinary skill in the art after reading this disclosure. For example, the first smart device may be a smart ring and the second smart device may be a game console. When the user wears and authenticates themselves to a smart ring and turns on or approaches a gaming console, the techniques described above may be used to facilitate the gaming console may automatically logging into the user's account and opening specific programs. As another example, the first smart device may be a smart watch and the second smart device may be a corporate-issue laptop computer. When the user wears and authenticates themselves to a smart watch and turns on or approaches the computer, the techniques described above may be used to facilitate the laptop automatically logging into the user's account, that has specific programs provisioned, and logging into the user's e-mail or Slack account. As still another example, the first smart device may be a smart phone and the second smart device may be a hotel television. When the user authenticates themselves to the smart phone and approaches the television, the techniques described above may be used to facilitate the television automatically logging into a user's Netflix account, or the like. In light of the present patent disclosure, it is believe that one of ordinary skill in the art will contemplate additional applications that are within the scope of embodiments of the present invention.

In other embodiments, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
providing, with a wearable device, a plurality of identification signals associated with a user;
receiving the plurality of identification signals with a second device;
determining, with a processor of the second device, configuration data for the second device in response to the plurality of identification signals, the configuration data comprising one or more user preferences associated with the user;
configuring, with the processor of the second device, the second device in response to the configuration data and in accordance with the one or more user preferences;
receiving a user input comprising an instruction for the second device to perform a tangible action; and
directing, with the processor of the second device, the tangible action to be performed in response to the configuration data and in response to the user input.

2. The method of claim 1, wherein configuring the second device in response to the configuration data comprises:
configuring one or more physical parameters associated with the second device in accordance with the one or more user preferences.

3. The method of claim 1, wherein directing the tangible action to be performed comprises:
directing a display of the second device to display visual data, directing an audio device of the second device to play audio data, or both.

4. The method of claim 1, wherein the configuration data is based at least in part on one or more physical characteristics of the user, wherein directing the tangible action to be performed comprises:
directing the second device to adjust one or more physical components of the second device based at least in part on the one or more physical characteristics of the user.

5. The method of claim 1, further comprising:
authorizing the user based at least in part on one or more criteria, wherein directing the tangible action to be performed in response to the configuration data is based at least in part on authorizing the user.

6. The method of claim 1, wherein the configuration data further comprises a user account associated with the user for the second device, and wherein the tangible action comprises logging the user into the user account.

7. The method of claim 1, wherein the wearable device comprises a smart ring, a smart watch, or a smart fitness tracker.

8. The method of claim 1, wherein the second device comprises a second wearable device, a smart phone, a virtual reality (VR) or augmented reality (AR) system, a personal computer, a smart watch, or a television.

9. The method of claim 2, wherein the one or more physical parameters comprise audio parameters, display parameters, or haptic feedback parameters.

10. The method of claim 5, wherein the one or more criteria comprise authentication of a token associated with the user and signed by an authentication provider service, authentication of biometric data associated with the user, authentication of a movement of the wearable device, or any combination thereof.

11. The method of claim 10, further comprising:
obtaining the biometric data from the user; and
authenticating the biometric data associated with the user based at least in part on a comparison of the biometric data with biometric data stored by the wearable device, wherein authorizing the user is based at least in part on authenticating the biometric data.

12. The method of claim 10, wherein providing the plurality of identification signals associated with the user comprises:
providing, with the wearable device, the token associated with the user and signed by an authentication provider service, wherein authorizing the user comprises:
authenticating the token with the processor of the second device, wherein the configuration data for the second device is determined in response to the token being authenticated.

13. A smart device, comprising:
a wireless communication device;
one or more physical components; and
one or more processors communicatively coupled with the wireless communication device and the one or more physical components, wherein the one or more processors are configured to:
receive, from a wearable device via the wireless communication device, a plurality of identification signals associated with a user;
identify configuration data for the smart device in response to the plurality of identification signals, the configuration data comprising one or more user preferences associated with the user;
configure the one or more physical components of second device in response to the configuration data and in accordance with the one or more user preferences; and
perform one or more tangible actions using the one or more physical components based at least in part on configuring the one or more physical components in accordance with the configuration data and the one or more user preferences.

14. The smart device of claim 13, wherein configuring the one or more physical components of the smart device comprise configuring one or more audio parameters, one or more display parameters, one or more haptic feedback parameters, or any combination thereof.

15. The smart device of claim 13, wherein the one or more physical components comprise a display, an audio device, or both, wherein, to perform the one or more tangible actions, the one or more processors are configured to:
display visual data using the display, play audio data using the audio device, or both.

16. The smart device of claim 13, wherein the configuration data is based at least in part on one or more physical characteristics of the user, wherein, to perform the one or more tangible actions, the one or more processors are configured to:
adjust the one or more physical components of the second device based at least in part on the one or more physical characteristics of the user.

17. The smart device of claim 13, wherein the one or more processors are further configured to:
authorize the user based at least in part on one or more criteria, wherein performing the one or more tangible actions is based at least in part on authorizing the user.

18. The smart device of claim 17, wherein the one or more criteria comprise authentication of a token associated with the user and signed by an authentication provider service, authentication of biometric data associated with the user, authentication of a movement of the wearable device, or any combination thereof.

19. The smart device of claim 13, wherein the second device comprises a second wearable device, a smart phone, a virtual reality (VR) or augmented reality (AR) system, a personal computer, a smart watch, or a television.

20. The smart device of claim 13, wherein the configuration data further comprises a user account associated with the user, and wherein, to perform the one or more tangible actions, the one or more processors are configured to:
log the user into the user account.

* * * * *